(12) United States Patent
Kärtner et al.

(10) Patent No.: US 6,462,878 B1
(45) Date of Patent: *Oct. 8, 2002

(54) DOUBLE CHIRPED MIRROR

(75) Inventors: Franz X. Kärtner, Cambridge, MA (US); Nicolai Matuschek, Lottstetten (DE); Ursula Keller, Zurich (CH)

(73) Assignee: Spectra Physics Lasers, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,606

(22) Filed: Aug. 15, 2001

Related U.S. Application Data (63) Continuation of application No. 09/080,904, filed on May 18, 1998, now Pat. No. 6,301,049.

(51) Int. Cl.[7] .............................. G02B 5/28; G02B 1/10; H01S 3/00
(52) U.S. Cl. .................... 359/588; 359/580; 359/337.5; 359/346; 372/99
(58) Field of Search ................................ 359/588, 584, 359/580, 337.5, 346; 372/99

(56) References Cited

U.S. PATENT DOCUMENTS

| | | | |
|---|---|---|---|
| 5,734,503 A | 3/1998 | Szipocs et al. ............. | 359/584 |
| 5,982,963 A | * 11/1999 | Feng et al. ................... | 385/37 |
| 6,163,637 A | * 12/2000 | Zirngibl ....................... | 385/37 |
| 6,301,049 B1 | * 9/2001 | Kartner et al. .............. | 359/588 |

OTHER PUBLICATIONS

F.X. Kartner et al., "Design and Fabrication of Double–Chirped Mirrors", Optics Letters, vol. 22, Jun. 1, 1997, pp. 831–833.

* cited by examiner

Primary Examiner—Jon Henry
(74) Attorney, Agent, or Firm—Paul Davis; Heller Ehrman White & McAuliffe (57) ABSTRACT

The invention is a double chirped mirror and a method of constructing a double chirped mirror for a frequency range of electromagnetic radiation, comprising specifying a design including a plurality of layers, the plurality of layers being transparent to the electromagnetic radiation and having refractive indices which vary between layers in the plurality of layers, and wherein for a first set of layers the optical thickness of alternate layers in the set of layers varies monotonically and the total optical thickness of a layer and the two adjacent half layers in the set of layers varies monotonically. The design is optimized by adjusting the optical thickness of layers in the plurality of layers.

17 Claims, 10 Drawing Sheets

Optical layer thickness for all layers of the initial structure shown separately.
This shows clearly, the double chirped section after the 14 layer AR coating which stretches up to the 38th layer.

FIG. 2A

Sum of the optical layer thicknesses of a high and low index pair of the initial structure.
This shows clearly, that the initial structure has a linearly chirped Bragg wave vektor, i.e., the inverse some of the optical thicknesses is linearly chirped.

Mirror characteristics of analytic initial design. The full line denotes the current design, the dashed line the design goal, and the dash-dotted the difference between both.

FIG. 3

After optimization of only GD with $W_{GD} = 1$ all other weights are zero.

Optical layer thicknesses for all layers of the <u>final</u> structure shown separately.
The changes during optimization are small even in the AR coating section, since the pump transmission is already included in the AR coating design from the beginning.

FIG. 7A

The sum of the optical layer thicknesses of a high and low index pair <u>after</u> optimization.
The changes during optimization are surprising small.

DOUBLE CHIRPED MIRROR

CROSS-REFERENCE TO RELATED APPLICATIONS

This application is a continuation of U.S. Ser. No. 09/080,904, filed May 18, 1998, now U.S. Pat. No. 6,301,049 which application is fully incorporated by reference herein.

BACKGROUND OF THE INVENTION

1. Field of the Invention

The invention relates to the field of reflective dielectric structures, and more particularly to broadband reflective dielectric structures used as mirrors in laser systems.

2. Description of Related Art

Ultra short-pulse generation has advanced to a level where the bandwidth of standard Bragg mirrors, e.g. composed of $TiO_2$ and $SiO_2$ quarter-wave layers, limits the pulse width or tunability of the generated laser pulses. The limitation is two fold. First, due to the limited difference in refractive index of both materials, e.g., $n_{TiO_2} \approx 2.4$ and $n_{SiO_2} \approx 1.45$ the high reflectivity bandwidth of a standard quarter-wave Bragg mirror centered at 800 nm is only about 200 nm. Second, the higher order group delay dispersion (GDD) produced by quarter-wave Bragg mirrors further limits the useful bandwidth to about 100 nm which is just enough bandwidth for 10 fs pulses.

In a chirped mirror, the Bragg wavelength, $\lambda_B$, of the individual layer pairs is varied from layer pair to layer pair (e.g. linearly), so that longer wavelengths penetrate deeper into the mirror structure than shorter wavelengths before being reflected. Such mirrors show an enlarged high reflectivity range and show a negative dispersion. However, the dispersion properties of these mirrors may be inadequate for ultra short pulse generation.

Chirped mirrors are also beneficial for the compression of high energy pulses, because they produce high dispersion with little material in the beam path, thereby avoiding nonlinear effects in the compressor. Thus, the design of these mirrors is extremely important for the further development of ultra fast laser sources.

It turns out that the design of a chirped mirror does not necessarily lead to a smooth and controlled GDD of the mirror. Using standard transfer matrix analysis of the multilayer structure as discussed in "Exact coupled mode theories for multilayer interference coating with arbitrary strong index modulations," *IEEE J. Quant. Elec.*, vol. 33, March 1997, which is hereby incorporated by reference, one observes that the group delay produced by such a chirped mirror does not vary linearly with wavelength, as one would expect for a mirror with linearly chirped Bragg wavelength. The local average of the group delay shows the expected tendency to increase linearly with increasing wavelength. However, it also exhibits strong oscillations. The cause of these oscillations is the following. Longer wavelengths have to pass the first section of the Bragg mirror, which acts as a transmission grating for these wavelengths. The slight reflection in the front section interferes with the strong reflections from the deeper layers, as in a Gires-Tournouis Interferometer (GTI). The oscillations in the group delay have an amplitude of several tens of femtoseconds, which make these simple-chirped mirrors less useful for ultra short pulse generation.

What is needed is a mirror design which reduces the oscillations in the group delay, allowing control of the group delay dispersion while maintaining broad band reflectivity and low group delay dispersion.

SUMMARY OF THE INVENTION

One embodiment of the present invention is a double-chirped mirror in which an initial design of a double chirped mirror is generated and then perturbed to improve the group delay dispersion and reflectance characteristics by accounting for the frequency dependence of design parameters such as indices of refraction. In the initial design, the oscillations in the group delay are avoided by varying not only the Bragg period or Bragg wavelength in the mirror, but also by tailoring the coupling between the forward and the backward propagating waves inside the mirror such that spurious reflections leading to GTI-effects are consistently avoided. In this embodiment of the invention both quantities, the Bragg wavelength and the coupling coefficient, are chirped. The oscillations in the group delay are reduced or eliminated by a sufficiently slow increase in the coupling of the wave incident onto the mirror and the wave reflected from the mirror as the incident wave moves through the first sections of the mirror. This slow increase in the coupling of the waves, to avoid spurious reflection in the front section of the mirror, is provided by the matching sections.

In this embodiment of the invention, the mismatch and therefore the oscillations in the group delay are reduced by addressing two of the matching problems encountered in a standard chirped mirror. First, the medium from which the radiation is incident on the mirror is matched to the first layer of a second matching section mirror by a first matching section, which is, for example, provided by a high quality broadband antireflection coating. The antireflection coating can be designed with commercially available dielectric coating design programs. The second matching section has to match from the antireflection coating section to a simple chirped section. In this way, the double-chirped mirror is generated with a controlled group delay and an extended high reflectivity range when compared to standard dielectric Bragg mirrors. This analytic starting structure helps to avoid internal resonances in the multilayer structure.

In this embodiment, the material parameters used to construct the initial design are assumed to be constant in frequency over the frequency range of interest. Once the initial design has been constructed, a subsequent computer based perturbation of the initial design can take into account the wavelength dependence of the refractive indices of the materials used to construct the mirror, and other design goals, such as a highly transmitting wavelength range close to the high reflection wavelength range of the mirror which may be useful for coupling a pump laser beam into a laser cavity.

In one embodiment of the invention, each of the sections of the mirror comprises sets of layers in a plurality of layers. Layers in the plurality of layers are composed of materials with a high or low index of refraction for a frequency range of electromagnetic radiation.

In one embodiment of the invention, the perturbation of the initial design is achieved by constructing a merit function including the reflectance, group delay, and/or group delay dispersion of the mirror, or any combination of these parameters. The merit function is then optimized by adjusting the thicknesses of layers in sections of the mirror until acceptable reflectance, group delay, and/or group delay dispersion are achieved. In other embodiments, the reflectance portion of the merit function includes reducing the reflectance of the mirror in a wavelength range which may be used to transmit a pump laser beam through the mirror. In another embodiment of the invention, the merit function is alternately optimized for reflectivity, group delay and/or group delay dispersion by varying weighting functions.

In still another embodiment, the initial design is perturbed to achieve a final design such that the GDD varies by less than 100% from its average value, but by more than 20% from its average value over more than a continuous half part of the high reflectivity band of the mirror. In yet another embodiment of the invention, the initial design is perturbed to achieve a final design such that the GDD varies by less than 200% from its average value, but by more than 20% from its average value over more than a continuous half part of the high reflectivity band of the mirror. The high reflectivity band of the mirror is defined to mean a continuous frequency range over which the reflectivity of the mirror is higher than 99%.

In still other embodiments the initial design is perturbed to achieve a final design such that the GDD varies by less than 200% from its average value over the high reflectivity band of the mirror, less than 100% from its average value over the high reflectivity band of the mirror, less than 50% from its average value over the high reflectivity band of the mirror, or less than 20% from its average value over the high reflectivity band of the mirror.

Yet another embodiment of the invention is a method of constructing a double chirped mirror for a frequency range of electromagnetic radiation, comprising specifying a design including a plurality of layers, the plurality of layers being transparent to the electromagnetic radiation and having refractive indices which vary between layers in the plurality of layers, and wherein for a first set of layers the optical thickness of alternate layers in the set of layers varies monotonically and the total optical thickness of a layer and the two adjacent half layers in the set of layers varies monotonically. The design is perturbed by adjusting the optical thickness of layers in the plurality of layers to account for the frequency dependence of the refractive indices.

In another embodiment, perturbing the design includes reducing the difference between the group delay dispersion for a plurality of frequencies in the frequency range of interest and a design goal group delay dispersion for the plurality of frequencies. Perturbing the design may also include reducing the difference between the reflectance for a plurality of frequencies in the frequency range of interest and a design goal reflectance for the plurality of frequencies. Furthermore, perturbing the design may also include constructing a function having as its input a design goal and a current design parameter, wherein the output of the function is related to a difference between the design goal and the current design parameter.

In yet another embodiment, specifying the design includes specifying a second set of layers in the plurality of layers, wherein the optical thickness of a layer is the same as the optical thickness of two adjacent half layers in the set of layers, and the total optical thickness of the layer and the two adjacent half layers in the second set of layers varies monotonically. Specifying the design may also include specifying a third set of layers in the plurality of layers, wherein the optical thickness of each layer in the third set of layers is substantially a quarter-wavelength thick for a frequency in the frequency range of electromagnetic radiation. Additionally, specifying the design includes specifying a fourth set of layers in the plurality of layers, wherein the fourth set of layers comprises an antireflection coating.

Still another embodiment of the invention includes a double chirped mirror as part of a laser cavity. In this embodiment the laser may be a short pulse laser, or an ultrashort pulse laser, including a femtosecond laser. Yet another embodiment of the invention includes a double chirped mirror as part of an amplifier. In this embodiment the amplifier may be a short pulse amplifier, or an ultrashort pulse amplifier, including a femtosecond pulse amplifier. In another aspect of this embodiment, the amplifier is a high power amplifier.

BRIEF DESCRIPTION OF FIGURES

The number of layers represented is not intended to depict the actual number of layers for an embodiment of the device, but rather it shows the basic differences in the layering of the different sections.

DETAILED DESCRIPTION

In a chirped mirror, the Bragg wavelength, $\lambda_B$, of the individual layer pairs is varied from layer pair to layer pair (e.g. linearly), so that longer wavelengths penetrate deeper into the mirror structure than shorter wavelengths before being reflected. With such mirrors, one observes that the group delay does not vary linearly with wavelength, as one would expect for a mirror with linearly chirped Bragg wavelength. While a local average of the group delay shows the expected tendency to increase linearly with increasing wavelength, the group delay exhibits strong oscillations due to interference effects between the coupled radiation modes in the mirror structure.

Figure 8:
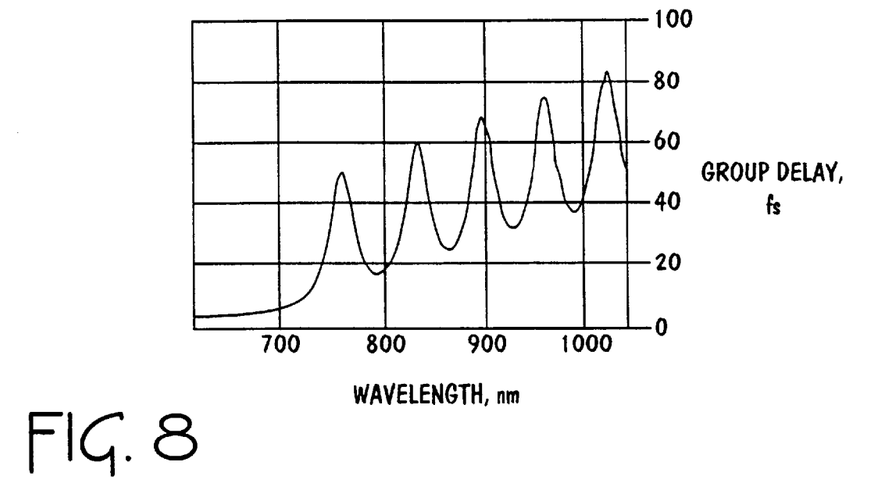
FIG. 8 illustrates the oscillatory characteristic of the group delay versus wavelength in a Bragg mirror.

FIG. 8 illustrates the oscillatory characteristic of the group delay versus wavelength in a Bragg mirror. In a Bragg mirror structure, longer wavelengths pass a first section, which acts as a transmission grating for these wavelengths. A slight reflection in the front section interferes with strong reflections from the deeper layers, as in a Gires-Tournouis Interferometer (GTI). These interference effects amongst the coupled forward and backward propagating waves in the layered structure of the mirror cause the strong oscillation in group delay shown in FIG. 8.

According to aspects of this invention, the problem of oscillations in the group delay of a mirror is solved by a mirror structure that matches an effective transmission impedance throughout the structure. Thus, embodiments of this invention not only have a chirp of the Bragg wavelength, but also a second chirp of a set of alternating layers. The resulting structure is termed a double-chirped mirror. Different embodiments have a second chirp of high index of refraction layers or a second chirp of low index of refraction layers according to the desired dispersion. In a double chirped mirror, the structure of the doubly chirped layers enables a slow variation of the effective transmission impedance through the mirror. This minimizes spurious reflections at index of refraction discontinuities, which are the cause of the oscillations shown in FIG. 8.

Figure 9:
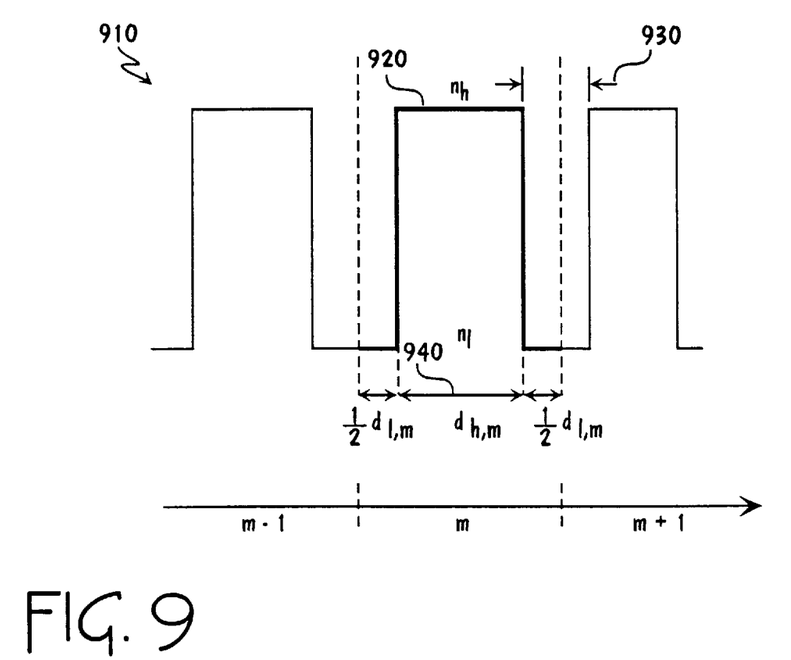
FIG. 9 shows a general Bragg mirror structure decomposed into a series of symmetric index steps.

A general Bragg mirror structure can be decomposed into a series of symmetric index steps, as shown in FIG. 9. In FIG. 9, Bragg structure 910, $m^{th}$ symmetric index of refraction step 920, low index of refraction thickness 930 and high index of refraction thickness 940 are shown. The decomposition of the Bragg mirror structure into a series of periodic symmetric index steps assists in mathematical analysis, as shown in "Design and fabrication of double-chirped mirrors," by F. X. Kärtner, M. Matuschek, T. Schibli, U. Keller, H. A. Haus, C. Heine, R. Morf, V. Scheuer, M. Tilsch, T. Tschudi, *Optics Lett.* 22, 831 (1997), which is hereby fully incorporated by reference. As shown for the case of negative dispersion in the above reference, a coefficient coupling of forward and backward propagating waves in a Bragg structure is a function of the optical phase delay in the high index of refraction layer. Thus, the effective transmission impedance can be varied over the Bragg structure by chirping the optical thickness of the high index of refraction layers. Analogous results hold for the case of positive dispersion.

Figure 1A:
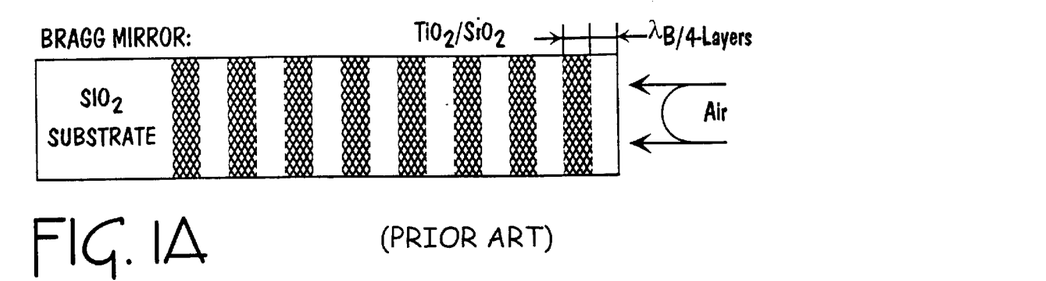
FIG. 1A depicts a representation of a Bragg mirror in the prior art.
Figure 1B:
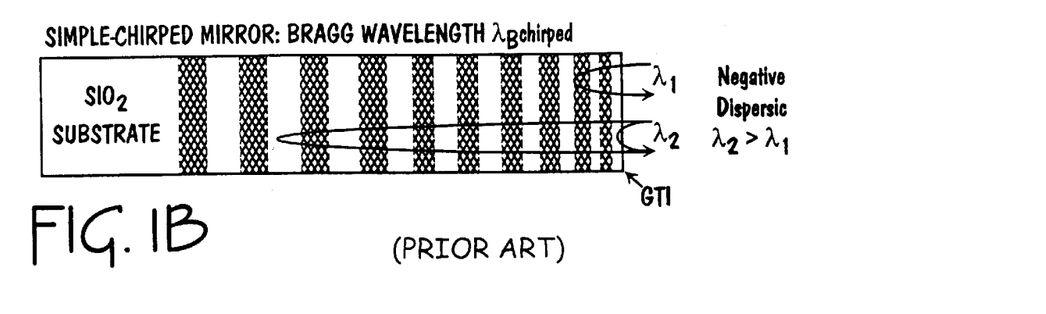
FIG. 1B depicts a representation of a simple-chirped mirror in the prior art.
Figure 1C:
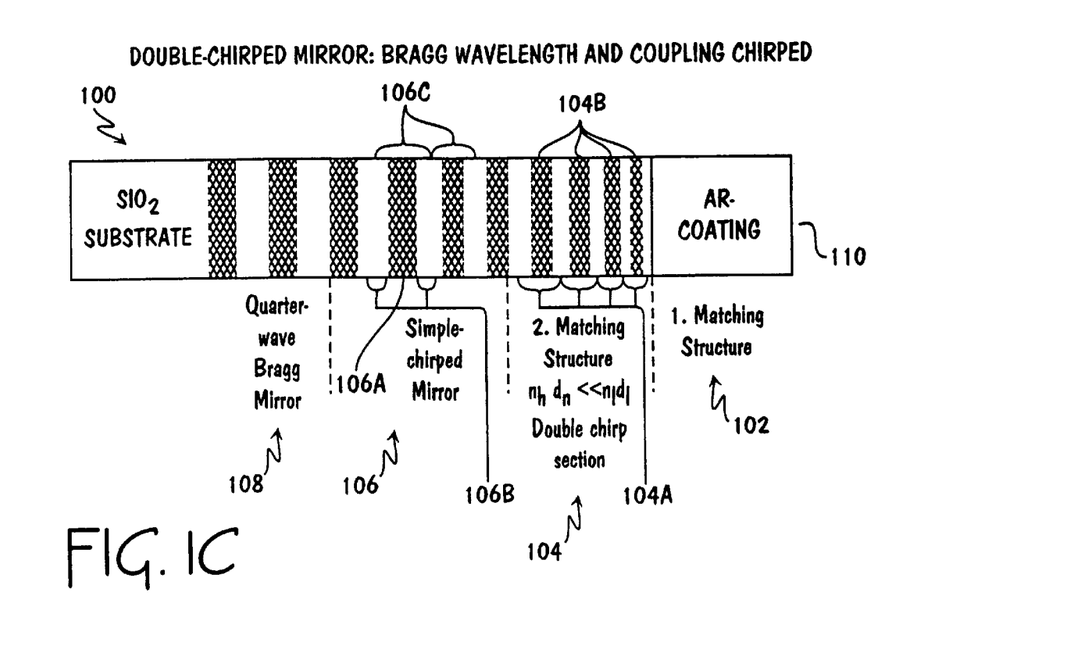
FIG. 1C depicts a simplified diagram showing an embodiment of the double chirped mirror.

FIG. 1a and FIG. 1b show prior art devices. FIG. 1c depicts an initial design for an embodiment of the present invention. This embodiment of the invention provides high reflectivity over a wavelength range of interest with a group delay dispersion which is suitable for use for dispersion compensation in ultrashort pulse lasers. The initial design for double chirped mirror 100 includes up to 4 sections: antireflection coating section 102, double chirp section 104, simple chirp section 106 and optional quarter wave stack 108. Each section is comprised of a plurality of alternate layers of a high refractive index material and a low refractive index material both of which are transparent over the frequency range of interest.

The layer can be deposited by techniques well known to those skilled in the art including but not limited to PVD, sputtering, ion plating, ion beam sputtering, CVD, MOCVD, molecular beam epitaxy, and chemical depth (sol gel). The low refractive index layer may be any material with a refractive index lower than that of the material chosen for the high refractive index material, and may be chosen from, but is not limited to the following materials: $SiO_2$, $MgF_2$, $Al_2O_3$, and $AlF_9$. The high refractive index layer may be any material with a refractive index higher than that of the material chosen for the low refractive index material, and may be chosen from, but is not limited to the following materials: $TiO_2$, $HfO_2$, $NbO_2$, $ZrO_2$, $Y_2O_2$, $AlO_2$, and $Gd_2O_3$.

Antireflection coating section 102 is a broadband antireflection coating that matches medium 110 to the first layer of double chirp section 104 to avoid interference effects arising from spurious reflections at the interface of the medium and the double chirp section. Medium 110 is any medium from which radiation is incident upon double chirped mirror 100 and includes but is not limited to air, glass, or a laser crystal. Antireflection coating section 102 can be any general broad band antireflection coating designed for use over the wavelength range of interest. See for example "Thin Film Optical Filters," by H. A. Macleod, published by Bristol, Adam Hilges, 1985, which is hereby incorporated by reference. In another embodiment of the invention, the antireflection coating is designed to be anti-reflecting for both the wavelength range of interest and a pump wavelength range.

Adjacent to antireflection coating section 102 is double chirp section 104. Double chirp section 104 initially acts to impedance match the radiation from antireflection coating 102 to simple chirp section 106.

In double chirp section 104, the total optical thickness of a layer and the two adjacent half layers in the set of layers 104A (see FIG. 9) increases monotonically from matching structure 102 to simple chirp section 106. This configuration causes the mirror to have a negative dispersion since the longer wavelength radiation is reflected from deeper in the mirror. Additionally, the optical thickness of a set of alternate layers 104B changes monotonically from matching structure 102 to simple chirp section 106. As depicted in FIG. 1, the optical thicknesses of layers 104A decreases monotonically from matching structure 102 to simple chirp section 106. In another embodiment if positive dispersion is desired then the total optical thicknesses of a layer and the two adjacent half layers in the set of layers 104A should decrease in thickness from matching structure 102 to simple chirp section 106. Set of alternating layers 104B is chosen based on what material matching structure 102 is designed to match to. For example, in one embodiment if medium 110 has a low index of refraction, then matching layer 102 should be chosen to match medium 110 to a low index layer of double chirp section 104. In this embodiment, set of alternate layers 104B will then be made of a low index of refraction material whose optical thickness will increase monotonically from matching layer 102.

Adjacent to double chirp section 104 is simple chirp section 106. Simple chirp section 106 comprises a set of layers wherein the optical thickness of a layer, e.g., 106A, is the same as the optical thickness of two adjacent half layers 106 B in the set of layers, and the total optical thickness of a unit 106C composed of a layer and the two adjacent half layers varies monotonically from double chirp section 104 to optional quarter wave stack 108. The thicknesses of layers in the simple chirp section is discussed in "Design and fabrication of double-chirped mirrors," by F. X. Kärtner, M. Matuschek, T. Schibli, U. Keller, H. A. Haus, C. Heine, R. Morf, V. Scheuer, M. Tilsch, T. Tschudi, *Optics Lett.* 22, 831 (1997), which is hereby fully incorporated by reference. In the embodiment of FIG. 1, the thicker units 106C are deeper in the mirror causing the mirror to have a negative dispersion, but without departing from the invention, the thickness of the units could be monotonically decreased rather than monotonically increased from section 102 to section 108 to give a positive dispersion.

Adjacent to simple chirp section 106 is optional quarter wave stack 108. Optional quarter wave stack 108 comprises alternating layers each of which are a quarter wavelength optical thickness at a wavelength in the frequency range of interest. In one embodiment, the quarter wave stack is designed to provide high reflectance at the longer wavelength end of the frequency range of interest and thus the layers are a quarter wavelength optical thickness at the selected longer wavelength. In this embodiment, the shorter wavelength radiation does not penetrate as deeply into the mirror, and it may therefore experience less loss than the longer wavelengths. In another embodiment of the invention, if the chirp of sections 104 and 106 were reversed then quarter wave stack 108 should be designed to reflect radiation at the shorter wavelength end of the frequency range of interest.

It should be noted that although the embodiment of the mirror depicted in FIG. 1 includes the quarter wave stack, this section is not required in order to use the present invention and it may be omitted.

In this embodiment of the invention, the perturbation of the initial design is achieved by constructing a merit function that includes terms for the reflectivity, the group delay, and the group delay dispersion over the reflectivity range of interest, and optionally, terms for the reflectivity in a range that includes the pump wavelength. The merit function is then optimized for group delay, then for group delay and reflectivity, then for group delay, reflectivity and group delay dispersion, and finally for the inclusion of all terms including, optionally, the pump wavelength reflectivity by adjusting the thicknesses of layers in sections of the mirror until acceptable values of reflectivity, group delay, group delay dispersion, and optionally pump wavelength transmission over the desired reflectivity range are achieved.

Figure 2A:
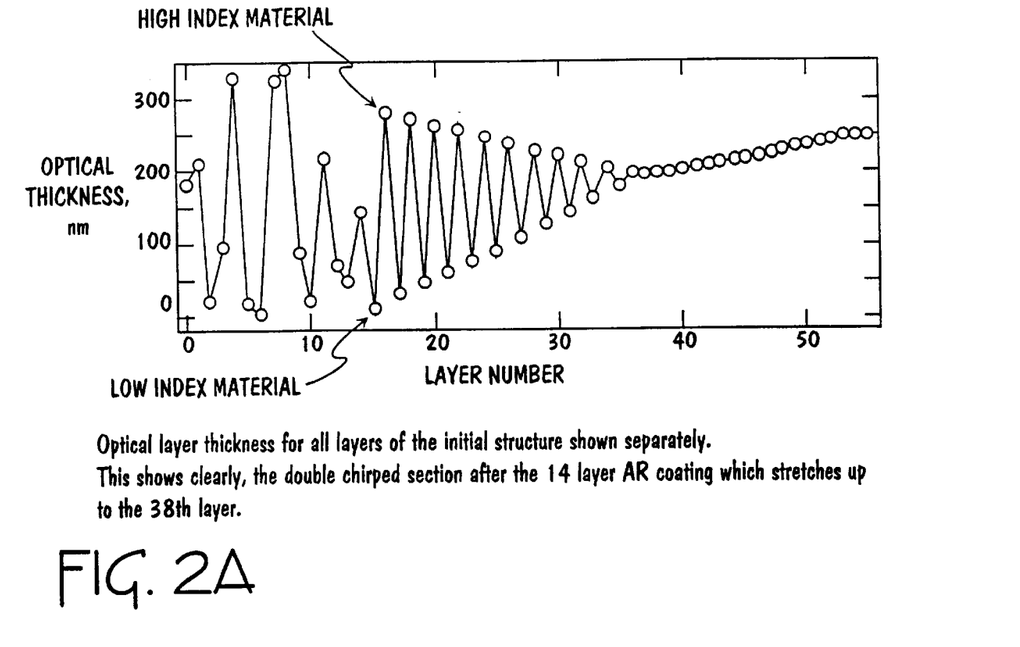
FIGS. 2A–C depict the optical and physical thicknesses of the layers for an embodiment of the invention at the initial design phase, and after optimization.
Figure 2B:
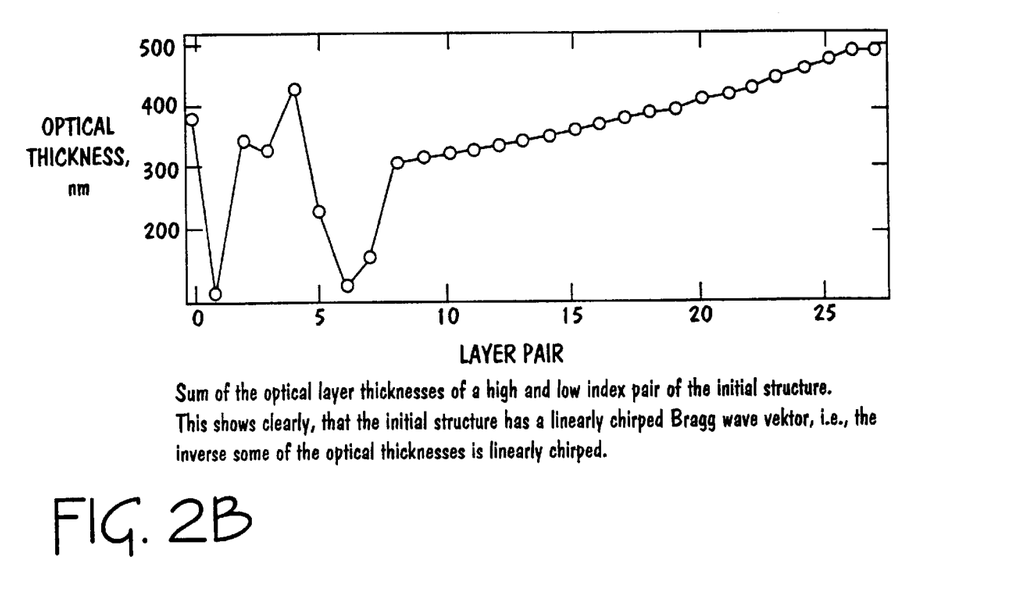
Figure 2C:
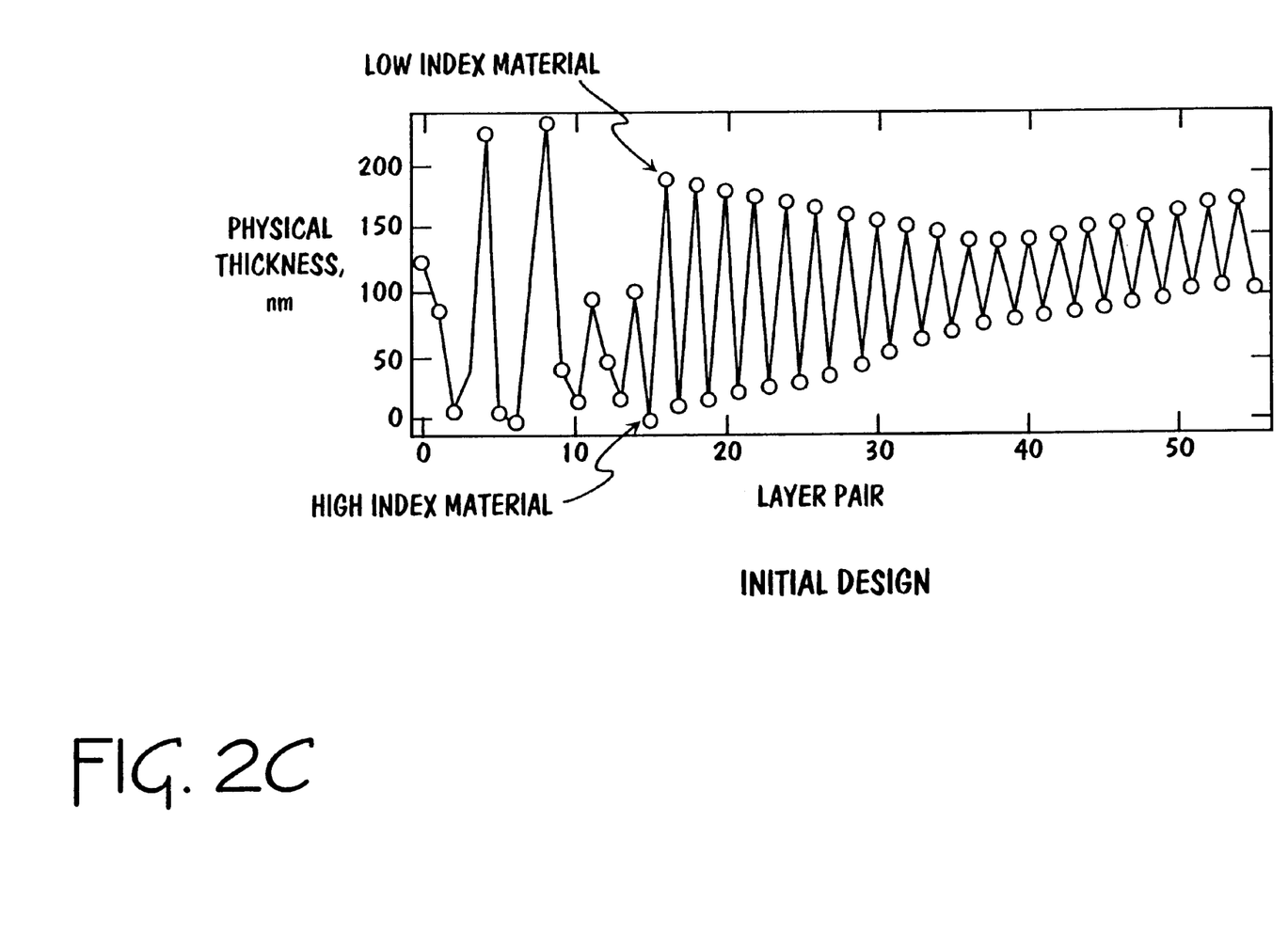

FIGS. 2A–C are graphs depicting another embodiment of the invention. The embodiment depicted in the graphs of FIG. 2 is for a mirror designed to operate over a wavelength range from 680 nm to 980 nm, and for a pump wavelength of 500 nm +/−20 nm. In this embodiment, 56 layers have been used to construct the initial design. These 56 layers are comprised of alternating layers of a high index material $TiO_2$ of index $n_h \approx 2.4$ and thickness $d_{h,m}$ for the high index layer in the $m^{th}$ layer pair, and a low index material $SiO_2$ of index $n_l \approx 1.45$ and thickness $d_{l,m}$ for the low index layer in the $m^{th}$ layer pair.

The total number of layers used to construct the initial design depends on the final result desired and can be determined through simple trial and error. Typically, 14 layers should be used for the antireflection coating matching section. For a discussion of antireflection coatings see "Optimal single band normal-incidence antireflection coatings," by J. A. Dobrowlski, A. V. Tikhonrurov, M. K. Trubetskoc, J. T. Sullivan, and P. G. Verly, Applied Optics, 35, pp. 644–658, (1996) which is hereby fully incorporated by reference. Approximately 40 layers should be used for the rest of the mirror in order to achieve high reflectivity over a 300 to 400 nm reflectivity range. More layers may be used, but as described below, this may result in layers being removed from the final optimized design.

FIG. 2A represent the optical thickness of the layers for the initial design of the mirror. The optical thickness is the physical thickness "d" of a layer multiplied by the index of refraction "n" of the layer. Layers 0 to 14 comprise the antireflection coating section of the mirror. Layers 15 to 38 comprise the double chirp section of the mirror. The double chirp of this section is apparent in the upwardly sloping line comprised of the high index layer material, and the downwardly sloping line comprised of the low index material. In this embodiment the high index layers increase monotonically in optical thickness going deeper into the mirror. This results in a gradual increase in the coupling coefficient giving a stronger coupling of the incident wave to the reflected wave, increasing local reflectance, as the incident wave passes through this section. This gradual increase of the coupling coefficient produces an impedance matching effect that reduces the GTI effect mentioned above.

Layers 39 to 54 comprise the simple chirp section. In this section, the optical thickness of a high index layer is equal to the optical thickness of the two adjacent low index half layers, and the optical thickness of adjacent units of the high index layer and the two adjacent low index half layers increases monotonically. The last few layers comprise the quarter wave stack in which each layer is a quarter wave optical thickness for a frequency in the long wavelength end of the frequency range of interest.

FIG. 2B depict the optical thickness of an adjacent pair of high and low index layers of the initial design depicted in FIG. 2A. In FIG. 2B, the 14 layer antireflection coating extends up to layer pair 7, the double chirp section extends from layer pair 8 through layer pair 19, and the simple chirp extends from layer pair 20 through layer pair 27. The quarter-wave section is layer pair 28. As is clear from FIG. 2B, the optical thickness of adjacent layer pairs maintains the same linear chirp through both the double chirp section and the simple chirp section. FIG. 2C depict the physical thickness of the high and low index layers of the mirror.

In another embodiment of the invention, the chirp in the simple chirp and double chirp sections need not be linear. A non-linear chirp can be used to shape higher order components of the GDD. Additionally, a non-linear chirp can be used to trade off reflectivity range and smoothness of the group delay.

Figure 3:
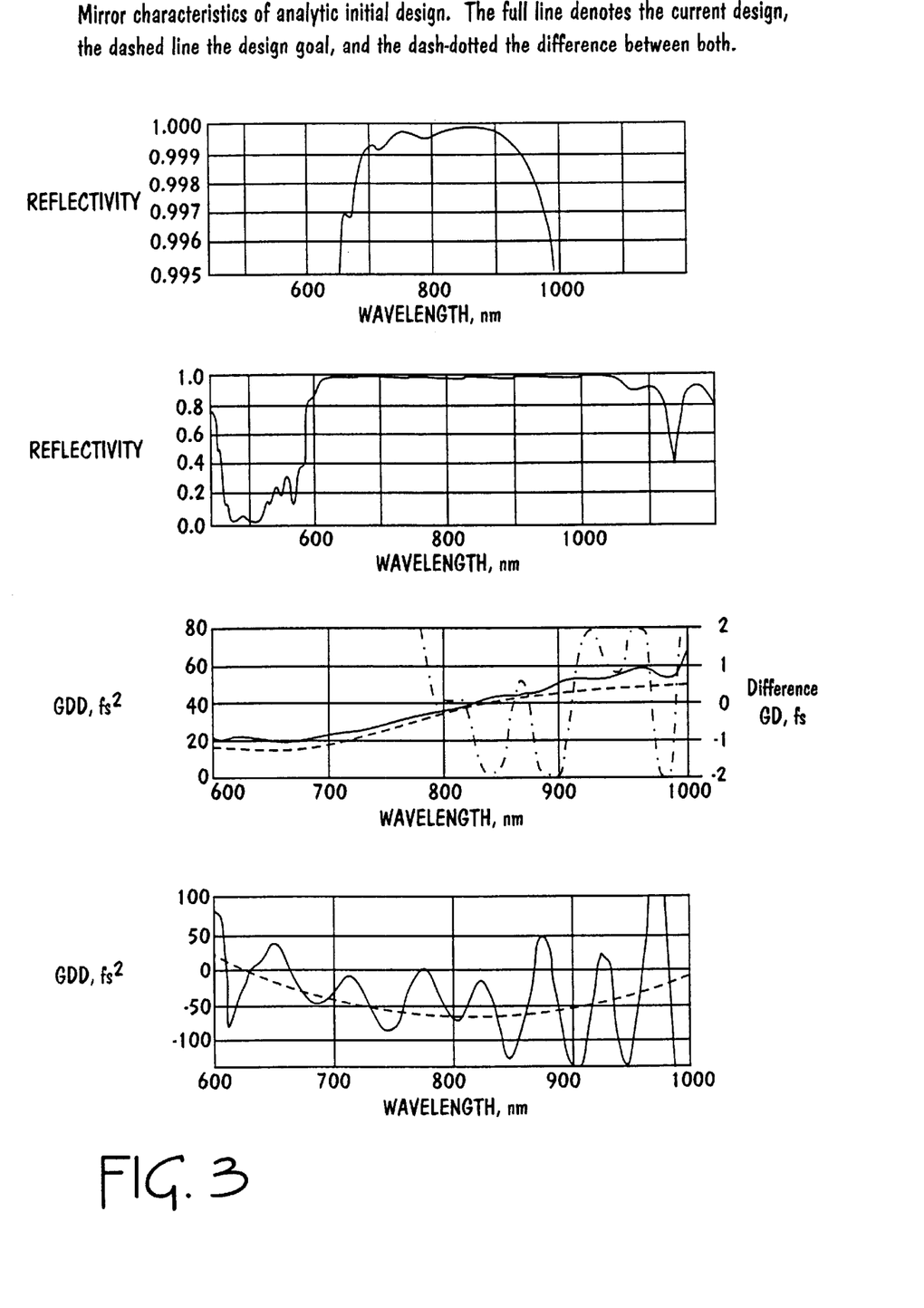
FIG. 3 depict the reflectivity, group delay and group delay dispersion for an embodiment of the invention at the initial design stage.

FIGS. 3A, 3B and 3C show the reflectivity, group delay, and group delay dispersion, respectively, of the initial design. The reflectivity plotted in FIG. 3A is the power reflectivity of the initial design mirror. The group delay, GD, of the mirror and the group delay dispersion, GDD, are related to the phase, $\phi(\omega)$, by building the first and second derivatives with respect to the circular frequency ($\omega = 2\pi c/\lambda$).

$$GD(\omega) = \frac{d\phi(\omega)}{d\omega} \quad GDD(\omega) = \frac{d^2\phi(\omega)}{d\omega^2}$$

As shown in FIG. 3A, the reflectivity of the initial design is high over more than a 200 nm bandwidth, and the GDD fluctuates approximately +/−50% on the short wavelength side and approximately +/−200% on the long wavelength side of the high reflectivity band of the mirror.

This initial design is used as the starting point for an optimization routine. In the optimization routine, the actual variations of the index of refraction over wavelength for the high and low index materials is taken into account.

In one embodiment, the optimization proceeds as follows. A merit function $F(\{d_m\})$ is defined which is to be minimized. This is a function of all layer thicknesses $d_m$ of the low and high index layers where "m" denotes the layer number. A suitable merit function should measure the difference between the current mirror characteristics and the desired characteristics.

In this embodiment the following merit function is used:

$$F(\{d_m\}) = w_P \sum_{i=1}^{N_1} |R(\omega_i) - R_{ref}(\omega_i)|^\alpha + w_R \sum_{i=N_2}^{N} |R(\omega_i) - R_{ref}(\omega_i)|^\alpha +$$

-continued $$w_{GD} \sum_{i=N_2}^{N} |GD(\omega_i) - GD_{ref}(\omega_i)|^\alpha + w_{GDD} \sum_{i=N_2}^{N} |GDD(\omega_i) - GDD_{ref}(\omega_i)|^\alpha$$

The merit function splits the frequency range into three intervals:

$[\omega_1, \omega_{N_2}]$, $[\omega_{N_2}, \omega_{N_2}]$ and $[\omega_{N_2}, \omega_N]$.

The first interval covers a frequency range for high transmission for a laser pump beam. The second interval does not enter the merit function and third interval is the high reflectivity range of the mirror for which the other properties are also optimized.

In this embodiment, 49 points were selected for the merit function, and this set of points were uniformly spaced throughout the interval $[\omega_1, \omega_N]$. Without departing from the present invention, the set of points selected for optimization in the merit function can be as large as is computationally feasible, and they need not be non-uniformly spaced in the interval(s) of interest. Fewer points are needed if the initial design is close to the design goals, and more points may be needed if the initial design is far from the design goals. In other embodiments of the invention, the number of points used throughout the optimization process is varied. For example, fewer points are chosen at the beginning of the optimization when the initial design is far from the design goals. Then as the design approaches the goals, more points are used. In still other embodiments of the invention, non-uniformly spaced points are used at the ends of the frequency range of interest in order to achieve better results at these end points.

In the merit function above, the desired mirror properties in reflectivity (R), group delay (GD), and group delay dispersion (GDD) have the index ref. The weights, $w_R$ $w_{GD}$ and $w_{GDD}$ set how strong the different mirror characteristics will contribute to the total merit function and can be adjusted interactively during the optimization process to ensure the usefulness of the final design. The exponent α is most often chosen as 1. If it is chosen large, it weights more strongly those frequency ranges where the largest deviation from the desired behavior occurs.

Without departing from the present invention, other merit functions can be used. A suitable merit function need only have as its inputs the design goals and the current design parameters. The merit function should also output one or more values related to the difference between the goals and the current parameters so that the output of the merit function can be used as feedback for the optimization process.

In this embodiment, the Broyden-Fletscher-Goldfarb-Shanno Algorithm was used to optimize the design by minimizing the merit function. This algorithm is described in detail in the book "Numerical Recipes in Fortran" by William H. Press, S. A. Technology, W. T. Vetterling, and B. P. Flannery in Cambridge, University Press (1986), which is hereby fully incorporated by reference. Without departing from the present invention, other algorithms can be used, including but not limited to statistical optimization routines, Monte-Carlo simulations, or any of the optimization routines in the "Numerical Recipes in Fortran" book cited above.

Figure 4:
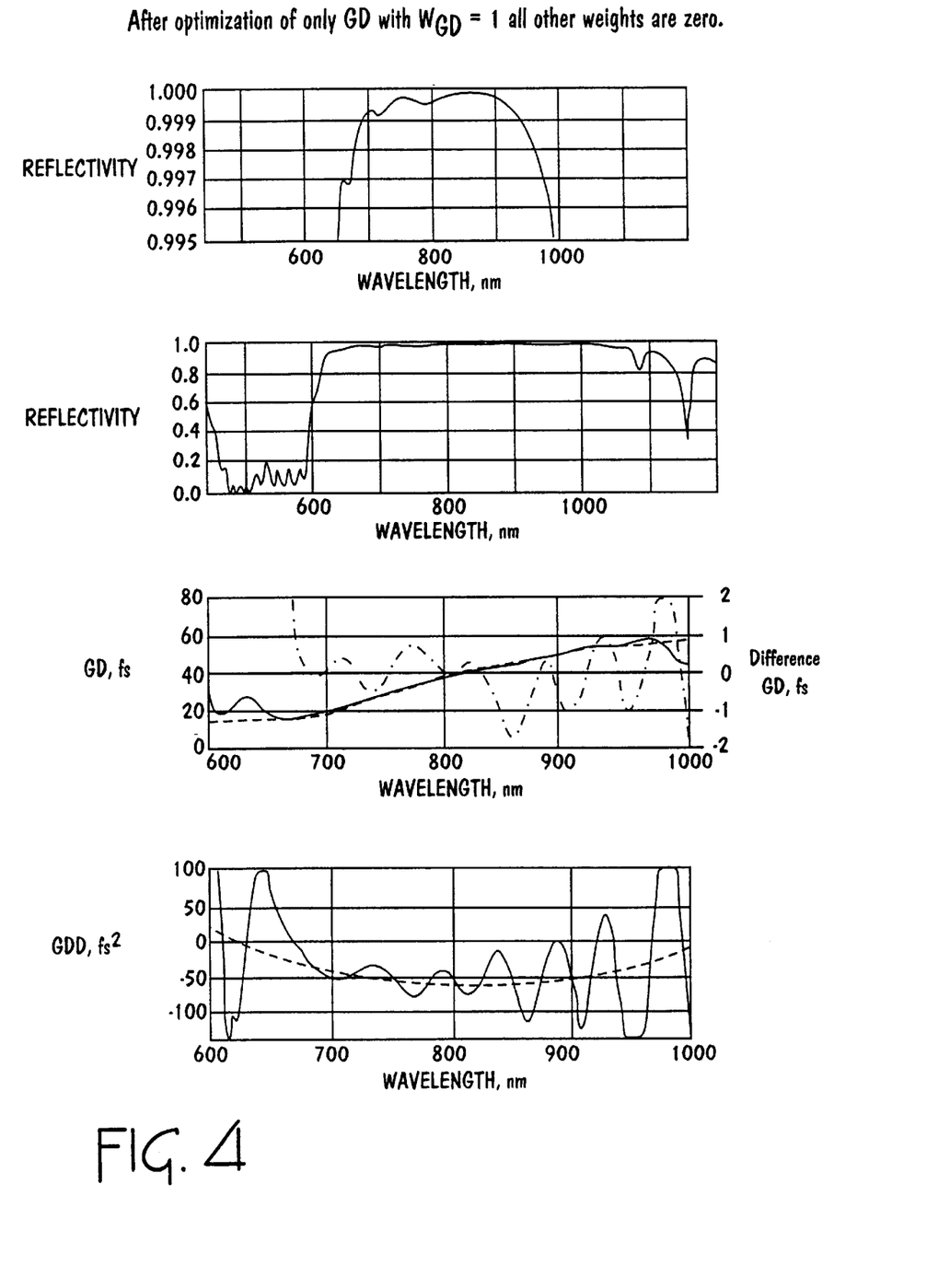
FIG. 4 depict the reflectivity, group delay and group delay dispersion for an embodiment of the invention after the group delay has been optimized with all other weights at zero.

Initially, $w_{GD}$ is set equal to 1, and all of the other weights are set to 0 and the merit function is optimized. The results of this optimization are shown in FIG. 4. Note the reduction in the group delay difference from the goal over the high reflectivity region from 680–980 nm, and the slight improvement in the reflectivity. A typical goal for optimization of the group delay at this step is a +/−1 fs variation in the group delay from the design goal. If this cannot be achieved, then more layers may have to be added to the initial design.

Figure 5:
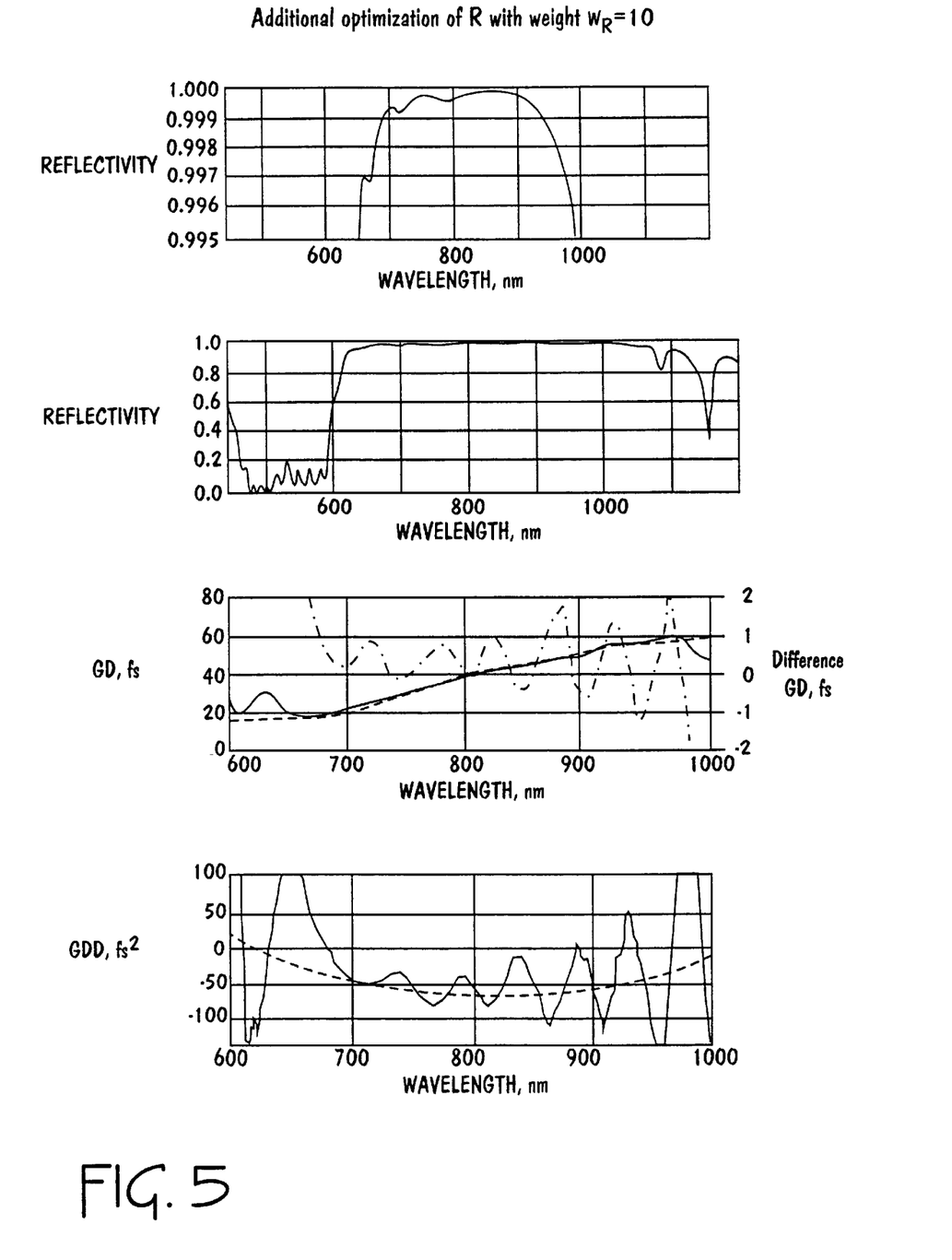
FIG. 5 depict the reflectivity, group delay and group delay dispersion for an embodiment of the invention after the group delay and reflectivity have been optimized with all other weights at zero.

Once the group delay has been optimized, the next step is to slowly start to increase the weight factor for reflectivity, $w_R$. One method that can be used is to increase $w_R$ until F has just about doubled and then optimize F again. Now double the value of $w_R$ and optimize again. Repeat this step until there is a noticeable change in the group delay. The results of this optimization are depicted in FIG. 5. In one embodiment, a noticeable change in the group delay is a change of about +/−1 fs at any of the points in the set of points.

Figure 6:
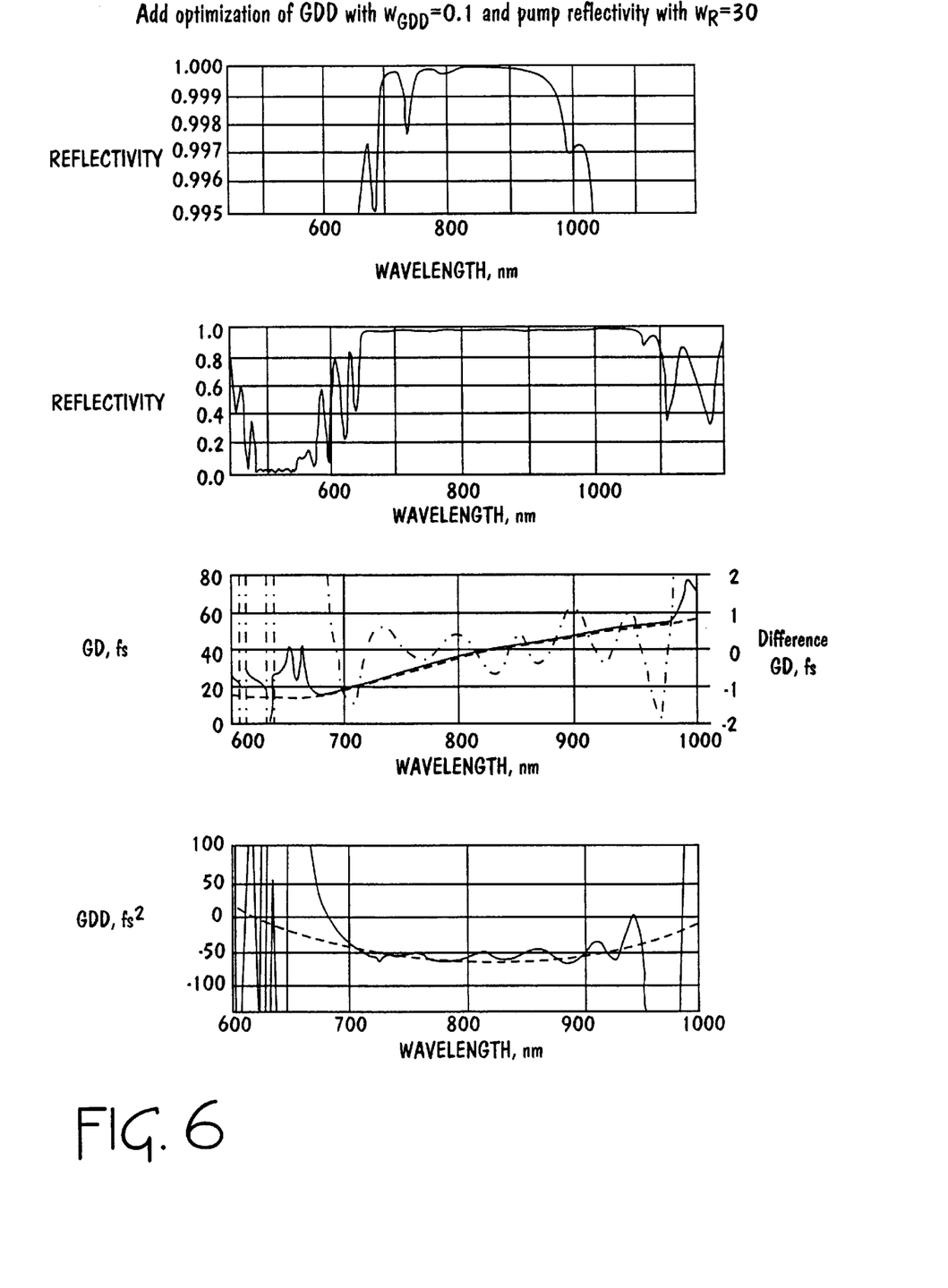
FIG. 6 depict the reflectivity, group delay and group delay dispersion for an embodiment of the invention after the group delay, reflectivity, group delay dispersion and pump reflectivity have all been optimized.

Next, the group delay dispersion is optimized by slowly increasing $w_{GDD}$. In one embodiment, $w_{GDD}$ is increased until it contributes about 10% to the total value of F. The merit function is then re-optimized. Then, continue increasing $w_{GDD}$ until the reflectivity starts to degrade. Next, $w_P$ is increased slowly and F is re-optimized until degradation of other features is noted. The results are depicted in FIG. 6. Note the degradation in reflectivity at approximately 730 nm.

If the optimization procedure has resulted in layers which are thinner than is practical to fabricate, then these layers are removed. A thin layer can be removed from the design by switching its index to the index of an adjacent layer, while maintaining the optical thickness of the layer. The merit function is then re-optimized. The removal of very thin layers may not even affect the merit function. Thick layers can be thinned by removing a half-wave of optical thickness for a wavelength near the center of the frequency range of interest for the mirror. The merit function is then re-optimizing. If the removal of these layers has too large of an effect on F, then they may have to be kept in the design.

In other embodiments F can be split up further so that wavelength dependent weighting factors can be used. For example, a gaussian reflectivity weighting over a small wavelength region (e.g., containing a reflectivity spike) can be used to help reduce the size of the spike.

Without departing from the present invention, The weights in the merit function may be increased in any order or one or more at a time. What is important in the present invention is that during the optimization procedure, progress toward achieving one of the design goals does not cause the optimization routine to settle in another local minimum of the merit function from which the best design for achieving the other design goals cannot be achieved.

FIGS. 4–6 depict the reflectivity, group delay and group delay dispersion for at various stages of the optimization process. In FIG. 4, only the group delay has been optimized. In FIG. 5 the group delay and reflectivity have been optimized with all other weights at zero. In FIG. 6 the group delay, reflectivity, group delay dispersion and pump reflectivity have all been optimized.

Figure 7A:
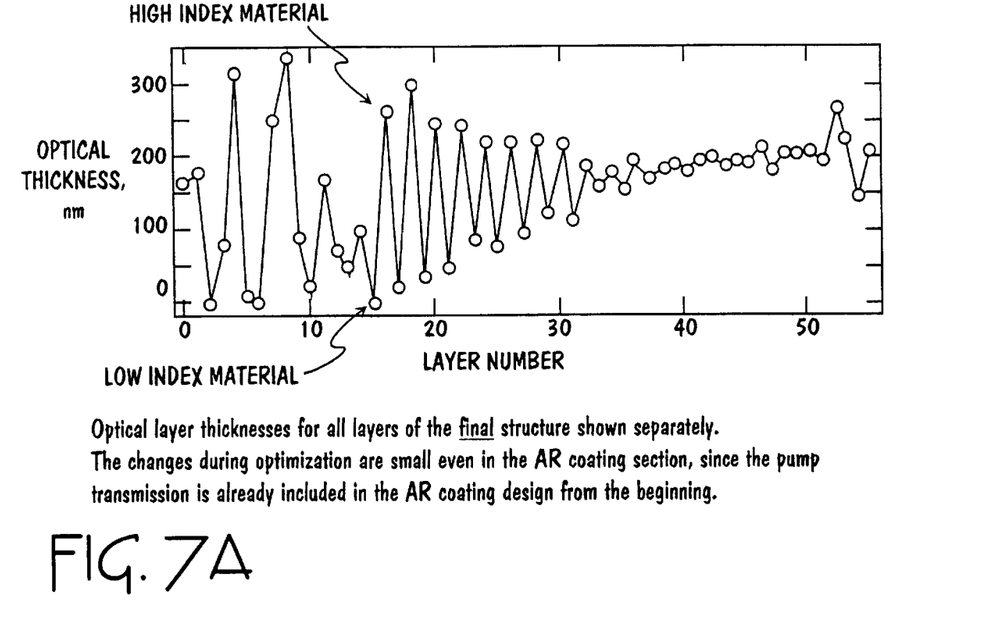
FIGS. 7A–C depict the optimized results for the layers of the corresponding optimized results of FIGS. 2A–C.
Figure 7B:
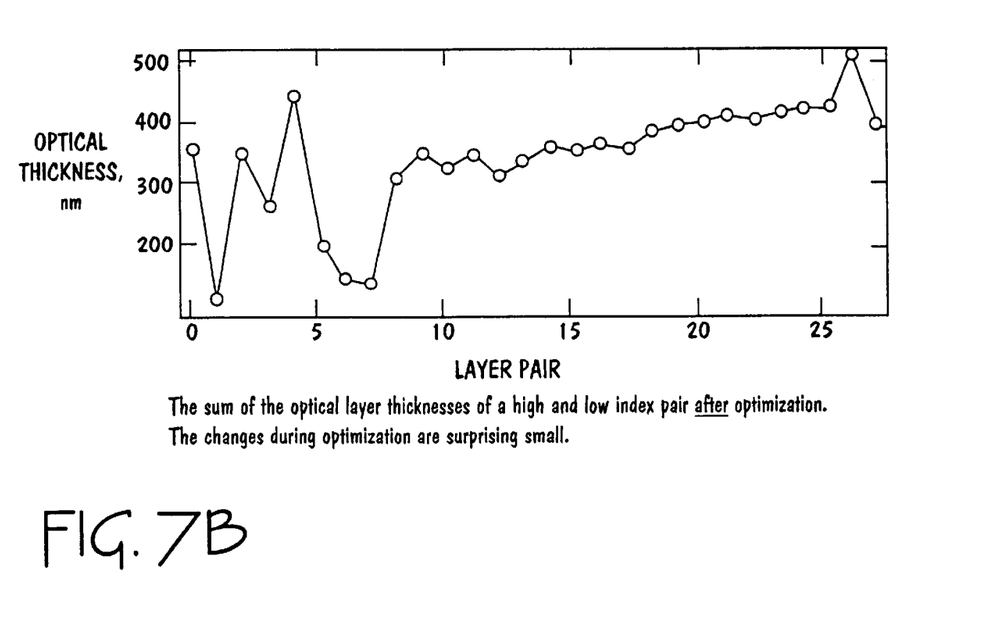
Figure 7C:
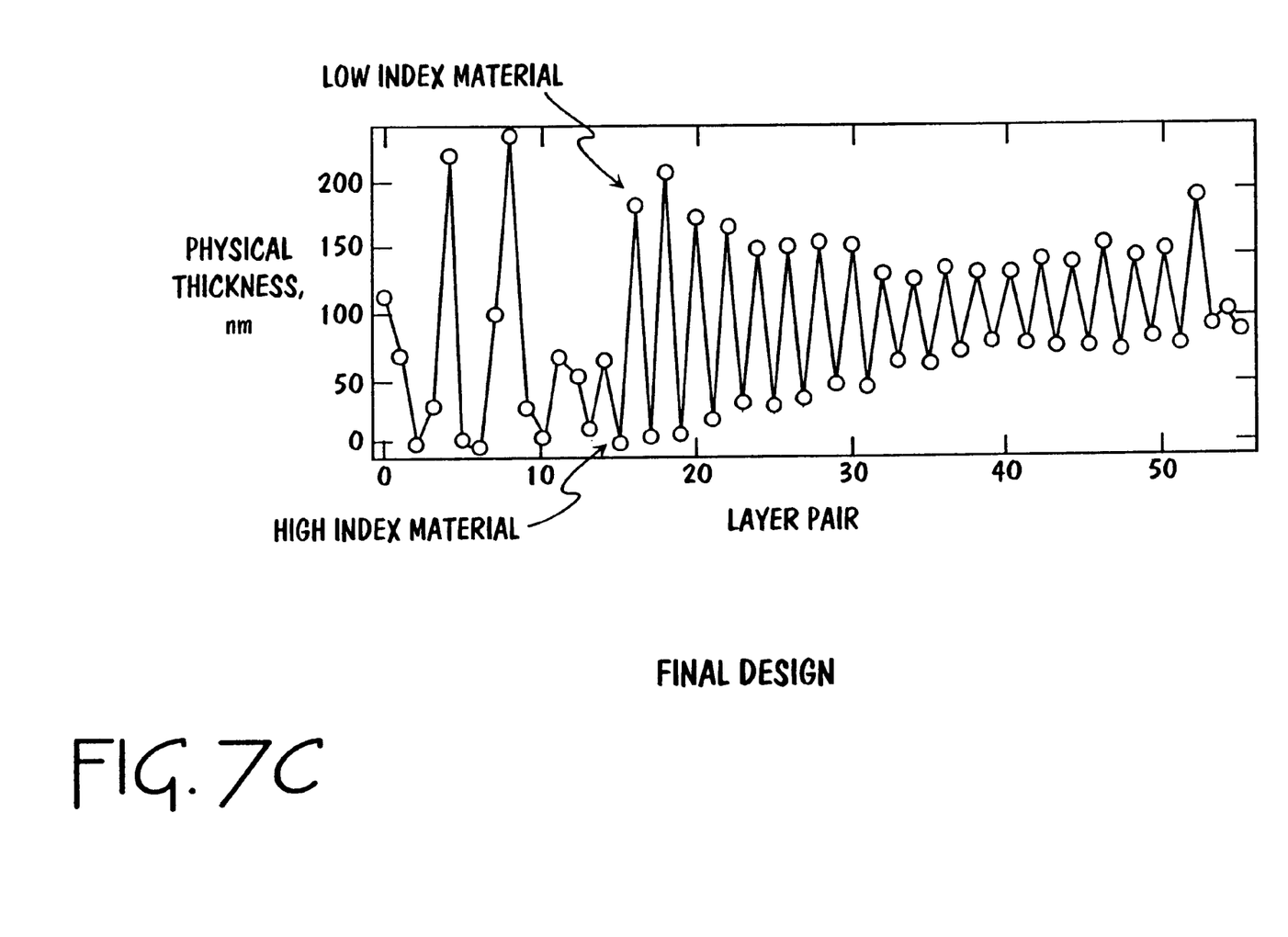

FIGS. 7A–C depict the optimized results for the layers of the mirror. These figures are the corresponding optimized results of FIGS. 2A–C.

The foregoing description of embodiments of the invention has been provided for the purposes of illustration and description. It is not intended to be exhaustive or to limit the invention to the precise form disclosed. Many modifications and variations will be apparent. The embodiments were chosen and described in order to best explain the principles of the invention and its practical application, thereby enabling others to understand the invention for various embodiments and with various modifications as are suited to the particular use contemplated. It is intended that the scope of the invention be defined by the following claims.

What is claimed is:

1. A method of constructing a mirror for a design frequency range, the design frequency range lying between a lower bound in the low microwave portion of an electromagnetic spectrum and an upper bound in the high X-ray portion of the spectrum, the mirror including a plurality of material layers being transparent to electromagnetic radiation in the design frequency range and having refractive indices that differ between individual layers in the plurality of layers, the differing refractive indices providing a spatial variation of optical thickness over the plurality of layers characterized by a plurality of sequential unit structures, each unit structure consisting of a central layer and two half-layers lying immediately adjacent to the central layer, the method comprising:

specifying an initial design including:

a double-chirped set of unit structures, wherein a central layer optical thickness varies over the double-chirped set such that a ratio of the central layer optical thickness to a sum of the optical thickness of two immediately adjacent half-layers varies monotonically over the double-chirped set, and a total optical thickness of each unit structure varies monotonically over the double-chirped set; and perturbing the initial design to account for frequency dependence of the refractive indices over the design frequency range by perturbing the optical thickness of layers in the initial design.

2. The method of claim 1, wherein:

perturbing the initial design includes reducing a difference between a group delay dispersion for a plurality of frequencies in the design frequency range and a design goal group delay dispersion for the plurality of frequencies.

3. The method of claim 1, wherein:

perturbing the initial design includes reducing the difference between a mirror reflectance for a plurality of frequencies in the design frequency range and a design goal mirror reflectance for the plurality of frequencies.

4. The method of claim 1, wherein:

specifying an initial design includes specifying a stack of layers, wherein the optical thickness of each layer in the stack is substantially a quarter-wavelength, the wavelength corresponding to a frequency in the design frequency range.

5. A double-chirped mirror for a design frequency range, the design frequency range lying between a lower bound in the low microwave portion of an electromagnetic spectrum and an upper bound in the high X-ray portion of the spectrum, the mirror including a plurality of material layers being transparent to electromagnetic radiation in the design frequency range and having refractive indices that differ between individual layers in the plurality of layers, the differing refractive indices providing a spatial variation of optical thickness over the plurality of layers characterized by a plurality of sequential unit structures, each unit structure consisting of a central layer and two half-layers lying immediately adjacent to the central layer, the mirror comprising:

a double-chirped set of unit structures, wherein a central layer optical thickness varies over the double-chirped set such that a ratio of the central layer optical thickness to a sum of the optical thickness of two immediately adjacent half-layers varies monotonically over the double-chirped set, and a total optical thickness of each unit structure varies monotonically over the double-chirped set.

6. The method of claim 1, wherein:

specifying an initial design includes specifying a quarter wave stack of layers, wherein the optical thickness of each layer in the stack is substantially a quarter wavelength, the wavelength corresponding to a frequency in the design frequency range.

7. The method of claim 1, wherein perturbing the optical thickness of layers is limited to perturbing the thickness of layers.

8. The method of claim 1, wherein perturbing the optical thickness of layers is limited to perturbing the index of refraction of layers.

9. The method of claim 1, wherein the monotonic variation produces a positive optical dispersion.

10. The method of claim 1, wherein the monotonic variation produces a negative optical dispersion.

11. The double-chirped mirror of claim 5, further comprising:

an anti-reflection coating including at least one material layer, the coating coupled to the double-chirped set of unit structures.

12. The double-chirped mirror of claim 5, further comprising:

a quarter wave stack of layers, wherein the optical thickness of each layer in the stack is substantially a quarter wavelength, the wavelength corresponding to a frequency in the design frequency range.

13. The double-chirped mirror of claim 11, further comprising:

a quarter wave stack of layers, wherein the optical thickness of each layer in the stack is substantially a quarter wavelength, the wavelength corresponding to a frequency in the design frequency range.

14. The double-chirped mirror of claim 5, further comprising:

an anti-reflection coating including at least one material layer, the coating coupled to the double-chirped set of unit structures;

a simple-chirped set of unit structures coupled to the double chirped set of unit structures, wherein the ratio of the central layer optical thickness to the sum of the optical thickness of two immediately adjacent half-layers is substantially constant over the simple-chirped set, and the total optical thickness of each unit structure varies monotonically over the simple-chirped set; and a quarter wave stack of layers, wherein the optical thickness of each layer in the stack is substantially a quarter wavelength, the wavelength corresponding to a frequency in the design frequency range.

15. The method of claim 1, wherein an initial design further includes:

a simple-chirped set of unit structures, wherein the ratio of the central layer optical thickness to the sum of the optical thickness of the two immediately adjacent half layers is substantially constant over the simple-chirped set, and the total optical thickness of each unit structure varies monotonically over the simple-chirped set;

an anti-reflection coating including at least one material layer, the coating coupled to the double-chirped set of unit structures; and a quarter wave stack of layers, wherein the optical thickness of each layer in the stack is substantially a quarter wavelength, the wavelength corresponding to a frequency in the design frequency range.

16. A laser, comprising:
a laser cavity with a gain medium disposed therein, the laser cavity including a double-chirped mirror; wherein
the double-chirped mirror comprises a set of unit structures, each unit structure consisting of a central layer and two half-layers lying immediately adjacent to the central layer;
the central layer optical thickness varies over the double-chirped set such that a ratio of the central layer optical thickness to a sum of the optical thickness of two immediately adjacent half-layers varies monotonically over the double-chirped set; and
a total optical thickness of each unit structure varies monotonically over the double-chirped set.

17. An optical amplifier, comprising:
a gain medium; and
a double chirped mirror; wherein
the double-chirped mirror comprises a set of unit structures, each unit structure consisting of a central layer and two half-layers lying immediately adjacent to the central layer;
a central layer optical thickness varies over the double-chirped set such that a ratio of the central layer optical thickness to a sum of the optical thickness of two immediately adjacent half-layers varies monotonically over the double-chirped set; and
a total optical thickness of each unit structure varies monotonically over the double-chirped set.

* * * * *